United States Patent
Chen et al.

(10) Patent No.: US 6,306,478 B1
(45) Date of Patent: Oct. 23, 2001

(54) ASYMMETRICAL TRIMETHINE CYANINE DYES FOR HIGH CAPACITY OPTICAL RECORDING MEDIUM

(75) Inventors: Hui-jen Chen, Tainan; Chang-sheng Huang, Hsin-Chu; Mei-jung Hu, Ping-Tung; Yi-shiu Lin, Hsin-Chu; Shyh-yeu Wang, Chung-Li; Chwei-jin Yeh, Taipei, all of (TW)

(73) Assignee: Ritek Corporation, Hsin Chu Industrial Park (TW)

( * ) Notice: Subject to any disclaimer, the term of this patent is extended or adjusted under 35 U.S.C. 154(b) by 0 days.

(21) Appl. No.: 09/478,967

(22) Filed: Jan. 6, 2000

(51) Int. Cl.[7] .................................................. B32B 3/02
(52) U.S. Cl. ................ 428/64.1; 428/64.2; 428/64.4; 428/64.8; 428/913; 430/270.18; 430/270.2; 430/270.21; 430/495.1; 430/945; 369/283; 369/288
(58) Field of Search .................... 428/64.1, 64.2, 428/64.4, 64.8, 913; 430/270.14, 270.18, 270.2, 270.21, 495.1, 945; 369/283, 288

(56) References Cited

U.S. PATENT DOCUMENTS

| | | | |
|---|---|---|---|
| 5,952,073 | * | 9/1999 | Hurditch ................ 428/64.1 |
| 5,976,658 | * | 11/1999 | Tomizawa ............... 428/64.1 |
| 6,077,584 | * | 6/2000 | Hurditch ................ 428/64.1 |
| 6,218,072 | * | 4/2001 | Otaguro ............... 430/270.21 |

* cited by examiner

Primary Examiner—Elizabeth Evans
(74) Attorney, Agent, or Firm—Birch, Stewart, Kolasch & Birch, LLP

(57) ABSTRACT

An optical recording layer of an optical recording medium comprises a dye material represented by the formula (I),

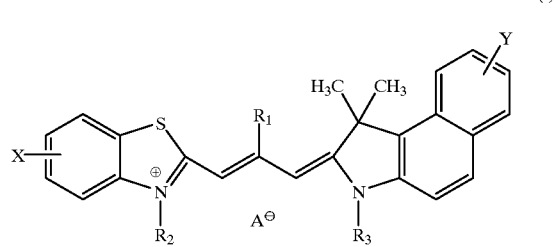

(I)

wherein $R_1$ is a hydrogen atom, a methyl group, or an ethyl group, $R_2$ and $R_3$ each is, independent from each other, a substituted or unsubstituted C1 to C12 alkyl group, $A^\ominus$ is an anion selected from the group consisting of halogen atoms, $ClO_4^\ominus$, $BF_4^\ominus$, $PF_6^\ominus$, $SbF_6^\ominus$, $CF_3SO_2^\ominus$, $C_2F_5SO_3^\ominus$, $CF_3COO^\ominus$, and $CH_3C_6H_4SO_3^\ominus$, X is hydrogen, alkyl, alkoxy, halogen, nitro, or fused benzene, Y is hydrogen, alkoxy, halogen, alkyl, aryl, alkoxycarbonyl, aryloxycarbonyl, alkylamine, arylamine, alkylamide, arylamide, alkylsulfonyl, aryl sulfonyl, alkoxysulfonyl, aryloxysulfonyl, nitro, or cyano groups.

5 Claims, No Drawings

ASYMMETRICAL TRIMETHINE CYANINE DYES FOR HIGH CAPACITY OPTICAL RECORDING MEDIUM

FIELD OF THE INVENTION

This invention relates to an asymmetrical trimethine cyanine dye material that has a maximum absorption wavelength from 550 nm to 590 nm and an optical recording medium comprising a substrate, a recording layer and a reflecting layer. The recording layer of the optical recording medium comprises the asymmetrical trimethine cyanine dye as recording material.

BACKGROUND OF THE INVENTION

Optical recording medium has been one of the most successful high capacity data storage media in the market, especially the CD-recordable (CD-R). CD-R disk comprises a spirally pre-grooved polymeric substrate, a recording layer, a reflecting layer and a protecting layer.

An optical sensitive material, usually a dye, is used in the recording layer. The dye material is spin-coated on the spirally pre-grooved polymeric substrate. A gold or silver reflecting layer is sputtered on the recording layer. An UV-cured protecting lacquer is then spin-coated on the reflecting layer. When writing information into the CD-R disk, laser beam is guided along the pre-groove and energy is released in a definite short pulse time. The dye in the pre-groove absorbs the energy of the laser beam and goes through a chemical change, usually decomposition, due to the increase of temperature. The increase of temperature will not only make the dye to decompose but also cause the polymeric substrate to melt and deform. Thus an optical difference is created between area of the pre-groove exposed by laser beam and area not exposed by laser beam. The digital information is thus recorded. Upon reading, laser beam with less energy is used.

The storage capacity of the optical recording medium is largely determined by the wavelength of the laser beam. The laser beam used in CD-recordable (CD-R) has a wavelength of about 780 nm. Diameter of the laser stylus (laser spot) is about 1.04 μm for a focussing lens with numerical aperture (NA) value of 0.45. The size of the disk and the diameter of the optical stylus of the laser thus determine the maximum storage capacity of the CD-R disk.

In order to increase the storage capacity of the optical medium, using a laser beam with shorter wavelength and a focussing lens with high NA value are the most effective ways. Digital Versatile Disk (DVD) is created by applying this concept. The recordable version of DVD is called DVD-R. Wavelength of the recording laser beam for DVD-R is 635 nm or 650 nm. Wave length of the reading laser beam for DVD-R is 650 nm with less power. Diameter of the optical stylus for 635 nm laser is about 0.635 μm with a focussing lens of numerical aperture value of 0.6. Thus the track pitch between grooves can be decreased to 0.74 μm and the storage capacity can be increased up to 4.7 GB for a single side DVD-R. If the storage capacity needs to be larger, then the numerical aperture has to be further increased.

The performance of DVD-R disc depends mostly on the properties of dye in the recording layer. These properties include optical properties, chemical properties, thermal properties, solubility, and solution properties. Selecting a proper dye with proper properties for the recording layer of DVD-R is very important.

Pentamethine cyanine dye has been well known for its successful application in CD-R. So, when searching for a suitable dye material for DVD-R, cyanine dye is one of the candidates to be considered. But due to the shorter laser beam wavelength used in writing and reading of DVD-R, trimethine cyanine is used instead of petamethine cyanine in order to get a suitable reflection and modulation of the DVD-R disk.

Among the different cyanine dyes, indolenine and benzindolenine-based cyanine dyes are most frequently applied in CD-R disk manufacturing and are also most frequently tried for DVD-R disk. U.S. Pat. No. 5,976,658 described the use of trimethine-based cyanine dye having symmetry or asymmetry indolenine structure for DVD-R application. JP 11-53761, 10-337959, 10-278426 also gave examples exclusively of applying trimethine based indolenine cyanine dyes in DVD-R Disk.

In JP 10-188339, examples were given about using symmetrical heterocyclic trimethine cyanine dye in high density optical recording media application.

There are still needs for finding better cyanine dyes for high density optical recording disk.

It is the first object of this invention to provide better timethine cyanine dyes with better recording properties for high density optical recording application.

It is the second object of this invention to provide an optical recording medium using the trimethine cyanine dye as its optical recording material.

SUMMARY OF THE INVENTION

It is the object of this invention to provide an optical recording material with structure represented by formula (I).

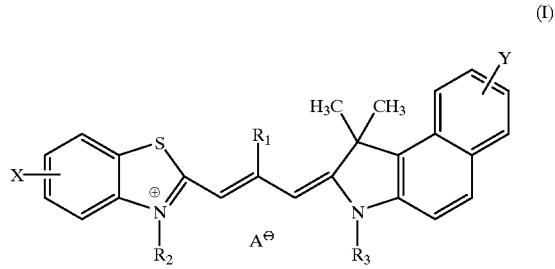

(I)

wherein

R$_1$ is a hydrogen atom, a methyl group, or an ethyl group,

R$_2$ and R$_3$ each is, independent from each other, a substituted or unsubstituted C1 to C12 alkyl group, A$^\ominus$ is an anion selected from the group consisting of halogen atoms, $ClO_4^\ominus$, $BF_4^\ominus$, $PF_6^\ominus$, $SbF_6^\ominus$, $CF_3SO_3^\ominus$, $C_2F_5SO_3^\ominus$, $CF_3COO^\ominus$, and $CH_3C_6H_4SO_3^\ominus$, X is hydrgen alkyl, alkoxy, halogen, nitro, or fused benzene, Y is hydrogen, alkoxy, halogen, alkyl, aryl, alkoxycarbonyl, aryloxycarbonyl, alkylamine, arylamine, alkylamide, arylamide, alkylsulfonyl, arylsulfonyl, alkoxysulfonyl, aryloxysulfonyl, nitro, or cyano groups.

This material has a maximum absorption wavelength from 550–590 nm and molar absorptivity greater than 1×10$^5$ cm$^{-1}$ mole$^{-1}$ liter. This trimethine cyanine dye is very suitable to be used as a recording material for high density optical recording medium. It is especially suitable for high density optical recording medium using a laser beam with wavelength of 620–660 nm It is another object of this invention to provide an optical recording medium having storage capacity greater than 3 Giga Bytes using the material represented by formula (I).

DETAIL DESCRIPTION OF THE INVENTION

Asymmetrical trimethine cyanine dye represented by formula (I) of this invention can be synthesized by different routes. For $R_1$ is a hydrogen atom, route 1, route 2, and route 3 can be used.

Route 1

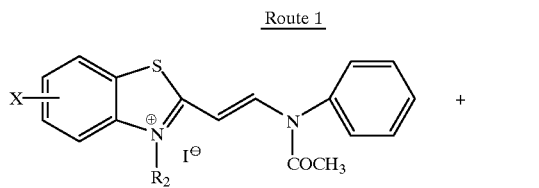

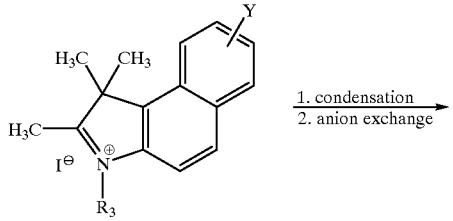

Route 2

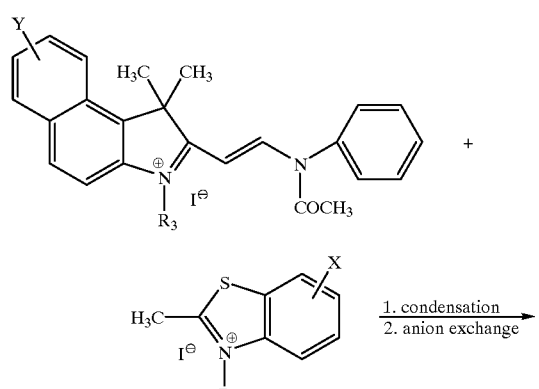

Route 3

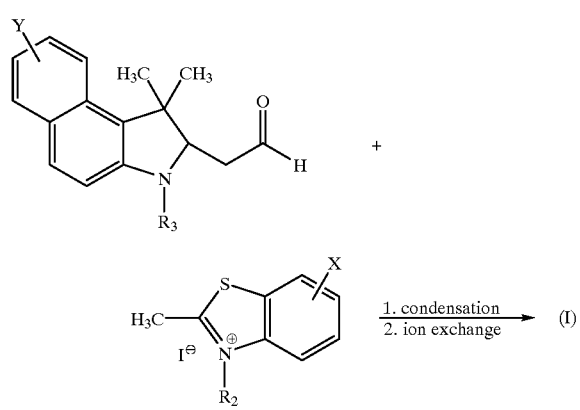

For $R_1$ is a methyl group or an ethyl group, route 4 can be followed.

Route 4

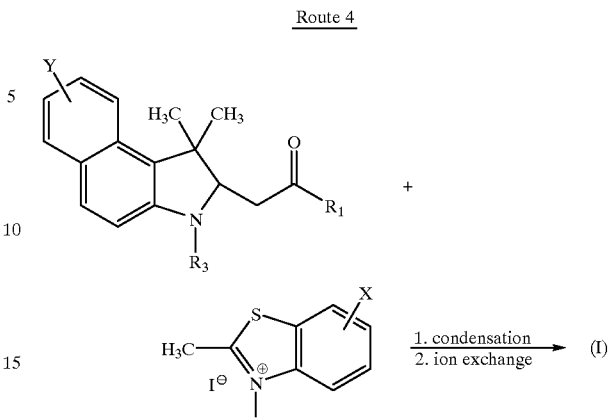

In route 1, 2, 3 and 4, $R_2$ and $R_3$ each is, independent from each other, a substituted or unsubstituted C1 to C12 alkyl group, $A^\ominus$ is an anion selected from the group consisting of halogen atoms, $ClO_4^\ominus$, $BF_4^\ominus$, $PF_6^\ominus$, $SbF_6^\ominus$, $CF_3SO_3^\ominus$, $C_2F_5SO_3^\ominus$, $CF_3COO^\ominus$, and $CH_3C_6H_4SO_3^\ominus$, X is hydrgen, alkyl, alkoxy, nitro, or fused benzene, X is hydrogen, alkoxy, halogen, alkyl, aryl, alkoxycarbonyl, aryloxycarbonyl, alkylamine, arylamine, alkylamide, arylamide, alkylsulfonyl, aryl sulfonyl, alkoxysulfonyl, aryloxysulfonyl, nitro, or cyano groups.

Route 1 and route 2 are synthetically opposite ways that can give the same compound. Route 1 starts with a benzothiazol compound, while route 2 starts with a benzindolenine compound. Both routes can be used to successfully obtain the asymmetrical trimethine cyanine represented by formula (I).

If route 3 and route 4 are used to synthesize asymmetrical trimethine cyanine dye, the opposite way which starts with bezothiazol compound will not give the same result as route 3 and route 4. This is due to the less reactivity of bezindolenine compound than benzothiazol compound toward the condensation reaction. The main difference between dye materials used in the CD-R and DVD-R is their optical properties, especially the absorption spectrum measured by UV spectrometer of the dilute solution of dye material. Pentamethine cyanine dyes used in CD-R usually have a maximum absorption wavelength in-between 640–700 nm. Phthalocyanine dyes used in CD-R has slightly higher maximum absorption wavelength in-between 680–730 nm. Both of the CD-R dyes have lower maximum absorption wavelength than the wavelength of laser beam used for CD-R, which is 780 nm.

Similarly it was found that the suitable trimethine cyanine materials used for DVD-R should have a maximum absorption wavelength about 50–80 nm less than the wavelength of laser beam which currently is in-between 620–660 nm. So it was found that the most suitable maximum absorption wavelength range for DVD-R dye material is in-between 550 to 590.

The maximum absorption wavelength of the asymmetrical trimethine dye represented by formula (I) fall just right into the proper range.

The preparation of DVD-R disk is expected to be almost same as CD-R disk because of their same recording principle. They both have the same basic structure which includes spirally pre-grooved substrate, recording layer on top of the substrate, and reflecting layer on top of the recording layer. These three layers provide the basic function of recording. The preparation process of single side DVD-R will be described as follow.

First, a spirally pre-grooved polymeric disk shape substrate is prepared by injection molding. The thickness of the disk is 0.6 mm for DVD-R. For 3.95 GB DVD-R disk, the track pitch is 0.8 μm. While for 4.7 GB DVD-R disk, the track pitch is 0.74 μm. The width of pre-groove can be in the range from 300 nm to 450 nm. The depth of pre-groove can be in the range from 80 nm to 220 nm. The materials used for the substrate can be any transparent amorphous polymer with good dimension stability, zero or very low birefringence, good thermal and mechanical properties. The preferred polymers are polymethylmethacrylate, polycarbonate, and amorphous polyolefin.

A recording layer is then formed on top of the polymeric substrate by spin-coating process. The dye material used in the recording layer can be any compound represented by formula (I), a mixture consisting of compounds represented by formula (I) or a mixture consisting of compounds represented by formula (I) and other recording dye materials.

Because spin-coating is a solution process, the dye material has to be dissolved in a certain solvent. The solvent can be a pure solvent or a mixture of different solvents. The most important requirement for the solvent or solvent mixture is that it should be able to dissolve a fare amount of recording material and not to damage the structure of pre-groove on the substrate. When polycarbonate or polymethyl methacrylate are used as the substrate materials, the commonly used solvents will include ethanol, 1-propanol, 2-propanol, methoxyethanol, ethoxyethanol, tetrafluoropropanol, diaceton alcohol, n-butyl ether, n-propyl ether, methyl cyclohexane, dimethyl cyclohexane, ethyl cyclohexane, and so on. The solvent used in the preparation process can be a single solvent or a mixture of different solvents. Those solvents which can dissolve polycarbonate and polymethylmethacrylate can also be used as one component of the mixture as long as the mixed solvents will not damage the surface of the substrate. If amorphous polyolefin is used as substrate material then the solvent choice will be much flexible.

Certain compounds can be used together with asymmetrical trimethine cyanine dye of this invention to improve the recording medium's light fastness and weather resistance. These compounds include an antioxidant, a UV absorber, and a singlet oxygen quencher.

A reflecting layer is then deposited on the recording layer by sputtering. The material used for the reflecting layer can be Au, Ag, Al, Cu, or their alloy. The thickness of the reflecting layer is better to be in the range from 40 nm to 150 nm. A protecting layer is formed by spin-coating an UV curable lacquer on the reflecting layer. Finally, an adhesive layer was applied on the top of protecting layer. Another 0.6 mm polymeric disk is bonded to the disk obtained above on top of the protecting layer. The adhesive can be applied by any of the three different processes, spin-coating, screenprinting, or roller coating.

The practice of this invention will be described as follow.

Synthesis of [2-(2-acetanilidovinyl)-benzothiazole butiodide]

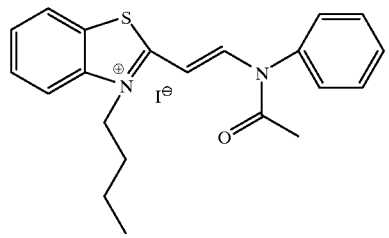

A three neck 300 mL reactor was equipped with a nitrogen inlet, a condenser, and a mechanical stirrer. 16.66 g of 2-methylbenzothiazol butiodide, 9.81 g of N,N-diphenylformamidine and 50 mL acetic anhydride were added into the reactor. Nitrogen flow was started and the solution was refluxed for 20 minutes. After cooled, 250 mL ether was added and stirred for overnight. The solution was filtered and solid was obtained. The solid was stirred with 100 mL acetone and then filtered to give 10 g of product: m.p.=170–174° C.; $^1$H NMR(400 MHz, CDCl3) δ8.89–8.86 (d,1H), 8.19–8.17 (d,1H), 7.95–7.93 (d,1H), 7.66–7.52 (m,5H), 7.40–7.39 (m,2H), 5.57–5.53 (d,1H), 4.44–4.40 (t,3H), 2.04 (s,1H), 1.62–1.58 (m, 2H), 1.18–1.13 (m, 2H), 0.7–0.67 (t, 3H).

Synthesis of Asymmetry Trimethine Dye A

Dye A

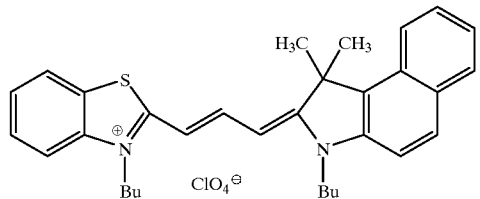

A three-neck 1000 mL reactor was equipped with a nitrogen inlet, a condenser, and a mechanical stirrer. 20 g of [2-(2-acetanilidovinyl)-benzothiazole butiodide], 16.44 g of 2,3,3-trimethylbenzo(e)indolenine butiodide, and 80 mL of pyridine were added into the reactor. Nitrogen flow was started and the solution was refluxed for 30 minutes. 15.36 g of sodium perchlorate was dissolved in 15 mL water and added into the solution. The whole solution was refluxed for another 30 minutes. After cooling to room temperature, the solution was poured into a large quantity of water. The product was extracted by methylene chloride. The organic phase was washed three times with water. Methylene chloride was removed and the residue was recrystallized from a mixture of methanol and pyridine to give 9 g of dye A: m.p.=220–222° C; λmax=561 nm; ε=1.72×10$^5$ cm$^{-1}$ mole$^{-1}$ liter (2,2,3,3,-tetrafluoro-1-propanol); $^1$H-NMR (400 MHz, CDCl$_3$) δ8.15–8.08 (m, 2H), 7.90–7.88(d, 2H), 7.73–7.71 (d, 1H), 7.59–7.50 (m, 2H), 7.44–7.24 (m, 4H), 6.93–6.90 (d, 1H), 6.62–6.59 (d, 1H), 4.39–4.35 (t, 2H), 4.16–4.13 (t, 2H), 1.95 (s, 6H), 1.87–1.81 (m, 4H), 1.56–1.49 (m,4H), 0.99–0.95 (m,6H).

Synthesis of Asymmetry Trimethine Dye B

Dye B

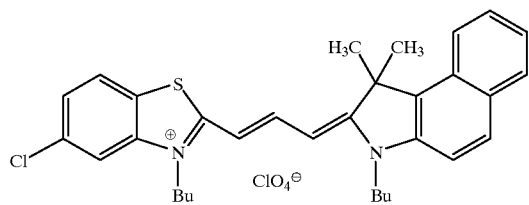

A three-neck 1000 mL reactor was equipped with a nitrogen inlet, a condenser, and a mechanical stirrer. 19 g of [2-(2-acetanilidovinyl)-5-chloro-benzothiazole butiodide], 14.57 g of 2,3,3-trimethylbenzo(e)indolenine butiodide, and 80 mL of pyridine were added into the reactor. Nitrogen flow was started and the solution was refluxed for 60 minutes. 15.61 g of sodium perchlorate was dissolved in 15 mL water and added into the solution. The whole solution was refluxed for another 30 minutes. After cooling to room temperature, the solution was poured into a large quantity of water. The product was extracted by methylene chloride. The organic phase was washed three times with water. Methylene chloride was removed and the residue was recrystallized from a mixture of methanol and pyridine to give 13 g of dye B: m.p.=227–229° C.; λ max=567 nm; ε=1.96×10$^5$ cm$^{-1}$ mole$^{-1}$ liter (2,2,3,2-tetrafluoro-1-propanol); $^1$H-NMR (400 MHz, CDCl$_3$) δ8.13–8.04 (m, 2H), 7.93–7.90(d, 2H), 7.61–7.57 (d, 2H), 7.48–7.43 (t, 1H), 7.36–7.29 (m, 3H), 7.04–7.00 (d, 1H), 6.81–6.77 (d, 1H) 4.34–4.29 (t, 2H), 4.23–4.18 (t, 2H), 1.95 (s, 6H), 1.88–1.80 (m, 4H), 1.58–1.50 (m, 4H), 1.03–0.96 (m, 6H).

Dye Solution Preparation

Different dye solutions were prepared. The concentrations were from 1 to 4 % solid in 2,2,3,3-tetrafluoro-1-propanol. The singlet oxygen quencher used was NQ-13 from Hayashibara Biochemical Laboratory, Inc.

The formulations of dye solutions are listed in Table 1.

TABLE 1

| Dye solution | Dye | Dye (% of solid) | Quencher (% of solid) |
|---|---|---|---|
| S1 | A | 100 | 0 |
| S2 | A | 90 | 10 |
| S3 | B | 100 | 0 |
| S4 | B | 90 | 10 |

DVD-R Disk Preparation

Polycarbonate disks with 12 cm diameter and 0.6 mm thickness were prepared by injection molding. The disk has spiral pre-groove and with pre-pits on the land area. Substrate with different kinds of pre-groove geometry were prepared. Two different track pitches were adopted which included 0.74 μm for DVD-R 4.7 GB and 0.8 μm for DVD-R 3.95 GB. A recording layer was formed by spin-coating the dye solution prepared above on the pre-grooved substrate. A 60 nm gold reflecting layer was formed by sputtering onto the recording layer. An UV cured protecting layer was coated on the reflecting layer by spin-coating method and cured. An UV-curable adhesive was applied onto the protecting layer by spin-coating process. Another 0.6 mm polycarbonate disk was bonded to the above prepared disk. The UV cured adhesive was then cured to give DVD-R disks.

DVD-R Test Results

A 10 minutes short motion picture were recorded into the thus prepared DVD-R disks by a commercial DVD-R writer. The recorded motion picture was played back by commercial DVD players. The high frequency signal were obtained by using Pulstec DVD-R tester.

Five different commercial DVD players manufactured by Sony, Acer, Pioneer, Panasonic and Toshiba were used to test the recorded DVD-R disks. Results showed that recorded motion picture in the thus prepared 3.95 DVD-R disks can be played back perfectly with every commercial plays.

The modulation, PI error, and jitter data are shown in Table 2.

TABLE 2

| HF Signal | S1 | S2 | S3 | S4 |
|---|---|---|---|---|
| I14A | 1.68 | 1.80 | 1.61 | 1.64 |
| I14M | 0.65 | 0.86 | 0.68 | 0.89 |
| I3A | 0.56 | 0.56 | 0.50 | 0.52 |
| I3M | 0.28 | 0.27 | 0.21 | 0.28 |
| PI error | 27 | 27 | 40 | 30 |
| Jitter (%) | 7.98 | 8.12 | 8.39 | 9.11 |

What is claimed is:

1. A dye material having an asymmetrical trimethine cyanine structure as represented by formula (I), and its maximum absorption wavelength being in between 550–590 mn that can be used as recording material for write once optical disk on which digital information is recorded by using laser beam with wavelength from 620 nm to 660 nm, (I)

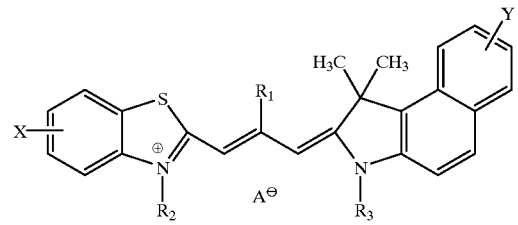

wherein $R_1$ is a hydrogen atom, a methyl group, or an ethyl group, $R_2$ and $R_3$ each is, independent from each other, a substituted or unsubstituted C1 to C12 alkyl group, $A^\ominus$ is an anion selected from the group consisting of halogen atoms, $ClO_4^{63}$, $BF_4^\ominus$, $PF_6^\ominus$, $SbF_6^\ominus$, $CF_3SO_3^\ominus$, $C_2F_5SO_3^\ominus$, $CF_3COO^\ominus$, and $CH_3C_6H_4SO_3^\ominus$, X is hydrogen, alkyl, alkoxy, halogen, nitro, or fused benzene, Y is hydrogen, alkoxy, halogen, alkyl, aryl, alkoxycarbonyl, aryloxycarbonyl, alkylamine, arylamine, alkylamide, arylamide, alkylsulfonyl, aryl sulfonyl, alkoxysulfonyl, aryloxysulfonyl, nitro, or cyano groups.

2. A dye material according to claim 1, wherein the maximum absorption wavelength is measured in a dilute solution of 2,2,3,3-tetrafluoro-1-propanol or methanol by a visible ultraviolet spectrometer.

3. An optical recording medium comprising an optical recording layer coated on a substrate, wherein said recording layer comprises a dye material represented by the formula (I).

4. An optical recording medium according to claim 3, further comprising a metal reflecting layer sputtered on the said recording layer.

5. An optical recording medium according to claim 3, wherein said recording layer further comprises an antioxidant, a UV absorber, and a singlet oxygen quencher.

* * * * *